US006303228B1

(12) United States Patent
Watanabe et al.

(10) Patent No.: US 6,303,228 B1
(45) Date of Patent: Oct. 16, 2001

(54) THERMAL TRANSFER RIBBON AND BASE FILM THEREOF

(75) Inventors: Shinya Watanabe; Shinji Yano; Kenji Suzuki, all of Sagamihara; Nobuyuki Harada, Tokyo, all of (JP)

(73) Assignees: Teijin Limited, Osaka; Dai Nippon Printing Co., Ltd., Tokyo, both of (JP)

( * ) Notice: Subject to any disclaimer, the term of this patent is extended or adjusted under 35 U.S.C. 154(b) by 0 days.

(21) Appl. No.: 09/509,079

(22) PCT Filed: Jul. 23, 1999

(86) PCT No.: PCT/JP99/03965

§ 371 Date: Mar. 22, 2000

§ 102(e) Date: Mar. 22, 2000

(87) PCT Pub. No.: WO00/05079

PCT Pub. Date: Feb. 3, 2000

(30) Foreign Application Priority Data

| | | |
|---|---|---|
| Jul. 24, 1998 | (JP) | 10-210088 |
| Jul. 24, 1998 | (JP) | 10-210089 |
| Jul. 24, 1998 | (JP) | 10-210090 |

(51) Int. Cl.[7] .......... B32B 27/08; B32B 27/30; B32B 27/36; B32B 27/40

(52) U.S. Cl. .......... 428/423.7; 428/480; 428/483; 428/694 ST; 428/910; 528/308; 427/372.2; 427/384; 427/385.5; 427/393.5

(58) Field of Search .......... 428/423.7, 480, 428/482, 483, 910, 694 ST, 694 SL; 427/372.2, 384, 385.5, 393.5; 528/308

(56) References Cited

FOREIGN PATENT DOCUMENTS

| | | | |
|---|---|---|---|
| 500 018 | | 8/1992 | (EP) . |
| 0 604 873 A1 | * | 7/1994 | (EP) . |
| 785 088 | | 7/1997 | (EP) . |
| 62 111719 | | 5/1987 | (JP) . |
| 62 95289 | | 5/1987 | (JP) . |
| 62 251190 | | 10/1987 | (JP) . |
| 62 299389 | | 12/1987 | (JP) . |
| 1 165633 | | 6/1989 | (JP) . |
| 2 39998 | | 2/1990 | (JP) . |
| 3 67695 | | 3/1991 | (JP) . |
| 03-207694 | * | 9/1991 | (JP) . |
| 3 213398 | | 9/1991 | (JP) . |
| 4 41297 | | 2/1992 | (JP) . |
| 08 281890 | | 10/1996 | (JP) . |
| 10-024665 | * | 1/1998 | (JP) . |

* cited by examiner

*Primary Examiner*—Vivian Chen
(74) *Attorney, Agent, or Firm*—Sughrue, Mion, Zinn, Macpeak & Seas, PLLC

(57) ABSTRACT

A base film for a thermal transfer ribbon which is a biaxially oriented polyester film comprising polyethylene-2,6-naphthalene dicarboxylate as a main constitutional element, wherein in a temperature-dimensional change curve under load in a longitudinal direction of the film, the dimensional change from the original length of the film at temperatures of up to 200° C. is 1.0% or less and the dimensional change from the original length of the film at temperatures of up to 230° C. is 3.0% or less. This film may have a coating layer of at least one water-soluble or water-dispersible resin selected from the group consisting of an urethane resin, polyester resin, acrylic resin and vinyl resin-modified polyester resin, on one side thereof. The base film gives a thermal transfer ribbon which has excellent adhesion to a sublimation-type ink layer and excellent printing performance without blurred ink at the time of high-speed printing and without wrinkles formed by friction with a head.

14 Claims, No Drawings

THERMAL TRANSFER RIBBON AND BASE FILM THEREOF

TECHNICAL FIELD

The present invention relates to a thermal transfer ribbon and to a base film thereof. More specifically, it relates to a thermal transfer ribbon for use as a transfer material for a thermal transfer printer, which has excellent printing performance without blurred ink at the time of high-speed printing and without wrinkles formed by friction with a head and to a base film thereof.

BACKGROUND ART

As a base film for a thermal transfer ribbon for use in a thermal transfer printer, one having a specific surface roughness (JP-A 62-299389) is known.

Of thermal transfer recording materials, demand for a sublimation-type transfer recording system has been sharply growing because the recording system is capable of outputting a high-quality full-color image with ease. The sublimation-type thermal transfer is a system in which only a thermally sublimating dye contained in a binder sublimes by heat and is absorbed into the image receiving layer of paper to which an image is transferred to form a gradation image. Since the temperature of a thermal head at the time of printing has become higher along with recent demand for higher printing speed, the quantity of heat received by a thermal transfer printer ribbon has increased. Therefore, the deformation of a film used as a base film of the ribbon has become larger, whereby an unclear printed image is produced or wrinkles are produced in a ribbon at the time of printing, or in an extreme case, printing is utterly impossible. Therefore, the improvement of printing performance has been desired.

Further, in sublimation-type thermal transfer, only a thermally sublimating dye contained in a binder sublimes by heat and is absorbed into the image receiving layer of paper to which an image is transferred to form a gradation image. In order to sublimate only the dye, high adhesion is required between the binder and the base film and, further, the adhesion must not be reduced by environmental changes and the passage of time. When the adhesion is not sufficient, the binder layer transfers to the paper and greatly impairs gradation, thereby causing an "over-transfer" phenomenon. Since a polyester film generally has highly oriented crystals, the film has such poor adhesion that an ink layer is not adhered to the polyester film at all even when it is formed on the film directly. Therefore, to improve the adhesion of the polyester film to the ink layer, a physical or chemical treatment is given to the surface of the film. However, sufficient adhesion still cannot be obtained even by the treatment.

When the ribbon is separated from an image-received sheet after printing, the ink layer may be taken away by the image-received sheet due to the delamination of the surface of the base film, which may cause abnormal transfer. Therefore, the improvement with regard to this has been desired.

DISCLOSURE OF THE INVENTION

It is an object of the present invention to provide a base film for a thermal transfer ribbon which has excellent printing performance without blurred ink at the time of high-speed printing and without wrinkles formed by friction with a head.

It is another object of the present invention to provide a base film for a thermal transfer ribbon, which is not heavily deformed at the time of heating, has excellent adhesion to a thermal transfer ink layer and can give a transferred image having excellent gradation.

It is still another object of the present invention to provide a thermal transfer ribbon comprising the above base film of the present invention as a base film and having the above excellent characteristic properties.

Other objects and advantages of the present invention will become apparent from the following description.

According to the present invention, firstly, the above objects and advantages of the present invention are attained by a base film for a thermal transfer ribbon, which is a biaxially oriented polyester film comprising polyethylene-2,6-naphthalene dicarboxylate as a main constitutional element, wherein in a temperature-dimensional change curve under load in the longitudinal direction of the film, the dimensional change from the original length of the film at temperatures of up to 200° C. is 1.0% or less and the dimensional change from the original length of the film at temperatures of up to 230° C. is 3.0% or less.

According to the present invention, secondly, the above objects and advantages of the present invention are attained by a thermal transfer ribbon comprising the above base film of the present invention and a sublimation-type thermal transfer ink layer formed on the base film.

PREFERRED EMBODIMENT OF THE INVENTION

The present invention will be described in detail hereunder.

Polyethylene-2.6-naphthalene Dicarboxylate

The thermal transfer ribbon of the present invention comprises polyethylene-2,6-naphthalene dicarboxylate as a main constitutional element. This polyethylene-2,6-naphthalene dicarboxylate is preferably a homopolymer whose recurring units are all ethylene-2,6-naphthalene dicarboxylate or a copolymer comprising ethylene-2,6-naphthalene dicarboxylate in an amount of at least 80 mol % of the total of all the recurring units. When the ethylene-2,6-naphthalene dicarboxylate is contained in an amount of 80 mol % or more of the total of all the recurring units, a film which undergoes only a small dimensional change at high temperatures can be obtained without impairing the characteristic properties of polyethylene-2,6-naphthalene dicarboxylate heavily.

A preferred copolymer component is a compound having two ester-forming functional groups in the molecule, as exemplified by dicarboxylic acids such as oxalic acid, adipic acid, phthalic acid, sebacic acid, dodecanedicarboxylic acid, succinic acid, isophthalic acid, 5-sodium sulfoisophthalic acid, terephthalic acid, 2-potassium sulfoterephthalic acid, 2,7-naphthalenedicarboxylic acid, 1,4-cyclohexanedicarboxylic acid, 4,4'-diphenyldicarboxylic acid, phenylindanedicarboxylic acid and diphenyl ether dicarboxylic acid, and lower alkyl esters thereof; oxycarboxylic acids such as p-oxyethoxybenzoic acid, and lower alkyl esters thereof; and glycols such as propylene glycol, 1,2-propanediol, 1,3-butanediol, 1,4-butanediol, 1,5-pentanediol, 1,6-hexanediol, 1,2-cyclohexanedimethanol, 1,3-cyclohexanedimethanol, 1,4-cyclohexanedimethanol, p-xylylene glycol, adduct of bisphenol A with ethylene oxide, triethylene glycol, polyethylene oxide glycol, polytetramethylene oxide glycol and neopentyl glycol.

The polyethylene-2,6-naphthalene dicarboxylate may have some or all of its terminal hydroxyl groups and/or carboxyl groups capped with a monofunctional compound such as benzoic acid or methoxypolyalkylene glycol, or it may be modified by such a trace amount of a polyfunctional ester-forming compound having 3 or more functional groups such as glycerin or pentaerythritol that a substantially linear polymer can be obtained.

Additives

The polyethylene-2,6-naphthalene dicarboxylate base film of the present invention may contain such additives as a stabilizer, dye, lubricant, ultraviolet absorber and flame retardant as desired.

To provide preferable slipperiness for the film, it is preferable that the film contain a small amount of inert fine particles. Illustrative examples of the inert fine particles include inorganic particles such as spherical silica, porous silica, calcium carbonate, silica alumina, alumina, titanium dioxide, kaolin clay, barium sulfate and zeolite; and organic particles such as silicone resin particles and crosslinked polystyrene particles. Synthetic inorganic particles are preferred to natural ones because they are uniform in size, and inorganic particles of any crystal form, hardness, specific gravity and color may be used.

The average particle diameter of the above inert fine particles is preferably in the range of 0.05 to 5.0 $\mu$m, more preferably 0.1 to 3.0 $\mu$m.

The content of the inert fine particles is preferably 0.001 to 1.0 wt %, more preferably 0.03 to 0.5 wt %.

The inert fine particles to be added to the film may consist of a single component or multiple components having two components or at least three components selected from the above examples.

The time of adding the inert fine particles is not particularly limited as long as it is before a polyethylene-2,6-naphthalene dicarboxylate film is formed. They may be added, for example, during polymerization or before film formation.

Thus, a biaxially oriented polyester film having an average surface roughness of 0.01 to 0.2 $\mu$m can be obtained by adding a lubricant. When the average surface roughness of the film is smaller than 0.01 $\mu$m, sufficient slipperiness cannot be obtained, thereby making it difficult to wind the film. When the average surface roughness is larger than 0.2 $\mu$m and high-speed printing is carried out with a thermal transfer printer, heat conductivity deteriorates and a printed image becomes unclear. When the particle size of the inorganic or organic lubricant to be added is smaller than 0.05 $\mu$m, sufficiently large surface roughness cannot be obtained, while when it is larger than 5 $\mu$m, the film is susceptible to breakage in the stretching step.

Thickness

The thickness of the polyethylene-2,6-naphthalene dicarboxylate base film for a thermal transfer ribbon of the present invention is preferably 0.5 to 10 $\mu$m. When the thickness is larger than 10 $\mu$m, heat conduction takes time, which is not preferable for high-speed printing. When the thickness is smaller than 0.5 $\mu$m, on the other hand, the base film has low strength and is inferior in proccessability and a ribbon obtained therefrom is apt to fail to have required strength.

Young's Modulus

The polyethylene-2,6-naphthalene dicarboxylate base film for a thermal transfer ribbon of the present invention preferably has a total of Young's modulus in a longitudinal direction (YMD) and Young's modulus in a transverse direction (YTD) of 1,200 kg/mm$^2$ or more, more preferably 1,230 kg/mm$^2$ or more. When the total is smaller than 1,200 kg/mm$^2$, the ribbon elongates during running, with the result that a unclear printed image is apt to be produced or the ribbon is apt to have wrinkles. The upper limit of the total of the Young's moduli is not particularly specified but is preferably 1,600 kg/mm$^2$, more preferably 1,500 kg/mm$^2$. When the total of the Young's moduli is higher than the above limit, the plane orientation of the molecular chain becomes too high, with the result of low tear strength, whereby the film is easily broken. Further, this also causes the delamination of the surface of the film.

YMD is preferably 620 kg/mm$^2$ or more, more preferably 650 kg/mm$^2$ or more. When YMD is smaller than 620 kg/mm$^2$, the orientation of the base film becomes low, whereby the base film becomes inferior in heat dimensional stability under load and hardly withstands tension applied thereto when the base film is used in a ribbon, whereby the ribbon is susceptible to wrinkles or breakage.

The value YMD-YTD is preferably 30 kg/cm or more, more preferably 50 kg/mm$^2$ or more. Since tension is mainly applied to the longitudinal direction of the film, orientation in the longitudinal direction is preferably made higher than that in the transverse direction.

In the present invention, the expression "temperature-dimensional change curve under load in the longitudinal and transverse directions of the film" (will also be referred to as "TMA curve" hereinafter) as used herein is a curve drawn by plotting the temperatures of the film on the axis of abscissas and dimensional changes from the original length of the film on the axis of ordinates when the film is heated at a fixed temperature elevation rate while both ends of the film in a longitudinal or transverse direction are held and a fixed load is applied to the film.

Temperature Dimensional Change Under Load

In the temperature-dimensional change curve under load in the longitudinal direction of the biaxially oriented polyester film used in the present invention, the film has a dimensional change from the original length at temperatures of up to 200° C. of 1.0% or less, preferably 0.6% or less, and a dimensional change from the original length under load at temperatures of up to 230° C. of 3.0% or less, preferably 1% or less.

When the dimensional change at temperatures of up to 230° C. is more than 3%, an image is distorted due to the poor dimensional stability of the film. Further, when the dimensional change is more than 3% in a film-shrinking direction, the shrinkage of the film becomes large by the heat of a head at the time of printing and friction between the film and the printing head becomes large, thereby breaking the film. When the dimensional change is more than 3% in a film-stretching direction, the film is wrinkled by the heat of the head at the time of printing, thereby making high-speed printing impossible.

The dimensional change at temperatures of up to 200° C. is 1.0% or less. If it is more than 1.0%, the dimensional stability of the film at the time of printing with low energy deteriorates, whereby an image is distorted or printing becomes impossible.

Further, the biaxially oriented polyester film of the present invention has a dimensional change from the original length at temperatures of up to 200° C. of preferably 1.0% or less, more preferably 0.6% or less, and a dimensional change from the original length at temperatures of up to 230° C. of preferably 3.0% or less, more preferably 1% or less, in the temperature-dimensional change curve under load in a transverse direction.

Density

The biaxially oriented polyester film used in the present invention preferably has a density of 1.3530 g/cm$^3$ to 1.3599 g/cm$^3$, more preferably 1.3560 g/cm$^3$ to 1.3598 g/cm$^3$. When the density of the film is below the above range, a film obtained tends to have low crystallinity and poor heat dimensional stability. When the density is above the range, the crystallinity becomes too high, causing non-uniformity in thickness and deteriorating flatness.

Refractive Index

The biaxially oriented polyester film used in the present invention preferably has a refractive index (nZ) in a plane perpendicular direction of 1.500 or more, more preferably 1.503 or more, much more preferably 1.505 or more. The upper limit of the refractive index is not specified but is preferably 1.520 or less. When the refractive index in the plane perpendicular direction is smaller than 1.500, the delamination of the surface of the base film easily occurs. When it is larger than 1.520, non-uniformity in thickness becomes large and flatness deteriorates.

Plane Orientation Coefficient

The biaxially oriented polyester film used in the present invention preferably has a plane orientation coefficient of 0.010 to 0.040, more preferably 0.015 to 0.035 measured by an X-ray diffraction symmetrical reflection method. When the plane orientation coefficient is above this range, a film which is sufficiently oriented is not obtained easily, and the film obtained is inferior in heat dimensional stability under load and cannot withstand tension applied thereto when it is used in a ribbon, whereby the base film is susceptible to wrinkles or breakage. When the plane orientation coefficient is below the range, orientation is satisfactory while the delamination of the surface of the film easily occurs.

Easily Adhesive Layer

The base film for a thermal transfer ribbon of the present invention preferably has a coating layer of at least one water-soluble or water-dispersible resin selected from the group consisting of an urethane resin, polyester resin, acrylic resin and vinyl resin-modified polyester on the surface of its ink layer side. This coating layer is preferable because it enhances adhesion between an ink layer comprising a sublimating dye and a resin binder and a polyester base film substrate. The coating layer may also be formed from an epoxy resin, melamine resin, oxazoline resin, vinyl resin or polyether resin.

The urethane resin comprises as constituent elements a polyol, polyisocyanate, chain extending agent and crosslinking agent as exemplified below. Examples of the polyol include polyethers such as polyoxyethylene glycol, polyoxypropylene glycol and polyoxytetramethylene glycol; polyesters such as polyethylene adipate, polyethylene-butylene adipate and polycaprolactone; acrylic polyols, and castor oil. Examples of the polyisocyanate include tolylene diisocyanate, phenylene diisocyanate, 4,4'-diphenylmethane diisocyanate, hexamethylene diisocyanate, xylylene diisocyanate, 4,4'-dicyclohexylmethane diisocyanate and isophorone diisocyanate. Examples of the chain extending agent or crosslinking agent include ethylene glycol, propylene glycol, diethylene glycol, trimethylolpropane, hydrazine, ethylenediamine, diethylenetriamine, 4,4'-diaminodiphenylmethane, 4,4'-diaminodicyclohexylmethane and water.

The urethane resin can be produced from the above components by a method known per se.

The polyester resin comprises as constituent elements a polycarboxylic acid and a polyhydroxy compound as exemplified below. That is, examples of the polycarboxylic acid include terephthalic acid, isophthalic acid, orthophthalic acid, phthalic acid, 4,4'-diphenyldicarboxylic acid, 2,5-naphthalenedicarboxylic acid, 2,6-naphthalenedicarboxylic acid, 1,4-cyclohexanedicarboxylic acid, 2-potassium sulfoterephthalic acid, 5-sodium sulfoisophthalic acid, adipic acid, azelaic acid, sebacic acid, dodecanedicarboxylic acid, glutaric acid, succinic acid, trimellitic acid, trimesic acid, trimellitic anhydride, phthalic anhydride, p-hydroxybenzoic acid, monopotassium trimellitates, and ester-forming derivatives thereof. Examples of the polyhydroxy compound include ethylene glycol, 1,2-propylene glycol, 1,3-propylene glycol, 1,3-propanediol, 1,4-butanediol, 1,6-hexanediol, 2-methyl-1,5-pentanediol, neopentyl glycol, 1,4-cyclohexanedimethanol, p-xylylene glycol, adduct of bisphenol A with ethylene glycol, diethylene glycol, triethylene glycol, polyethylene glycol, polypropylene glycol, polytetramethylene glycol, polytetramethylene oxide glycol, dimethylolpropionic acid, glycerin, trimethylolpropane, sodium dimethylolethyl sulfonate, potassium dimethylol propionate and the like. A polyester-based resin can be synthesized through a polycondensation reaction in accordance with a commonly used method by properly selecting at least one polycarboxylic acid and at least one polyhydroxy compound from the above compounds. It should be understood that the term “polyester-based resin” as used herein comprehends an acryl graft polyester as disclosed by JP-A 1-165633 and a composite polymer comprising a polyester component such as polyester polyurethane obtained by extending the chain of a polyester polyol with an isocyanate.

Examples of the acrylic resin include polymers of acrylic monomers, which are enumerated below. The acrylic monomers include alkyl acrylates and alkyl methacrylates (alkyl group is exemplified by methyl group, ethyl group, n-propyl group, isopropyl group, n-butyl group, isobutyl group, t-butyl group, 2-ethylhexyl group, cyclohexyl group and the like); hydroxy-containing monomers such as 2-hydroxyethyl acrylate, 2-hydroxyethyl methacrylate, 2-hydroxypropyl acrylate and 2-hydroxypropyl methacrylate; amide group-containing monomers such as acrylamide, methacrylamide, N-alkylacrylamide, N-alkylmethacrylamide, N,N-dialkylacrylamide, N,N-dialkylmethacrylate (alkyl group is exemplified by methyl group, ethyl group, n-propyl group, isopropyl group, n-butyl group, isobutyl group, t-butyl group, 2-ethylhexyl group, cyclohexyl group and the like), N-alkoxyacrylamide, N-alkoxymethacrylamide, N,N-dialkoxyacrylamide and N,N-dialkoxymethacrylamide (alkoxy group is exemplified by methoxy group, ethoxy group, butoxy group, isobutoxy group and the like), N-methylolacrylamide, N-methylolmethacrylamide, N-phenylacrylamide and N-phenylmethacrylamide; epoxy group-containing monomers such as glycidyl acrylate, glycidyl methacrylate and allylglycidyl ethers; acrylic acid, methacrylic acid, acrylonitrile, methacrylonitrile and the like. The acrylic resin can be produced by (co)polymerizing at least one of the above monomers in accordance with a method known per se.

The polyester of the vinyl resin-modified polyester resin comprises as constituent elements a polybasic acid or ester-forming derivative thereof, and a polyol or ester-forming derivative thereof as exemplified below. Examples of the polybasic acid include terephthalic acid, isophthalic acid, phthalic acid, phthalic anhydride, 5-sodium sulfoisophthalic acid, 2,6-naphthalenedicarboxylic acid, 1,4-cyclohexanedicarboxylic acid, adipic acid, sebacic acid, trimellitic acid, pyromellitic acid, dimer acid and the like. A copolyester resin can be synthesized from two or more of the above acid components. Further, trace amounts of an unsaturated polybasic acid such as maleic acid or itaconic acid and a hydroxycarboxylic acid such as p-hydroxybenzoic acid may be used. Examples of the polyol include ethylene glycol, 1,4-butanediol, diethylene glycol, dipropylene glycol, 1,6-hexanediol, 1,4-cyclohexanedimethanol, xylene glycol, dimethylolpropane, poly(ethylene oxide)glycol, poly (tetramethylene oxide)glycol and the like. Two or more of the above components may be used.

Examples of the vinyl resin used to modify the above polyester include polymers of vinyl-based monomers, which are enumerated below. The vinyl-based monomers include monomers containing a carboxyl group or salt thereof such as itaconic acid, maleic acid, fumaric acid, crotonic acid, styrenesulfonic acid and salts thereof (such as sodium salts, potassium salts, ammonium salts and tertiary amine salts); acid anhydride monomers such as maleic anhydride and itaconic anhydride; vinyl isocyanate, allyl isocyanate, styrene, α-methylstyrene, vinylmethyl ethers, vinylethyl ethers, vinyltrialkoxysilanes, alkylmaleic acid monoesters, alkylfumaric acid monoesters, alkylitaconic acid monoesters, vinylidene chloride, ethylene, propylene, vinyl chloride, vinyl acetate, butadiene and the like. The vinyl resin can be produced by copolymerizing at least one of the above monomers.

The vinyl resin-modified polyester resin can be produced by polymerizing a vinyl-based monomer in a water-soluble or water-dispersible polyester resin.

A coating solution for forming the above coating layer of a water-soluble or water-dispersible resin may contain an organic solvent in such a trace amount that does not affect the water-soluble or water-dispersible resin and other additives. The coating solution may contain a surfactant such as an anionic surfactant, cationic surfactant or nonionic surfactant as required. The surfactant is preferably capable of reducing the surface tension of the aqueous coating solution to 40 dyne/cm or less and promoting the wetting of a polyester film, as exemplified by polyoxyethylene alkylphenyl ethers, polyoxyethylene-fatty acid esters, sorbitan fatty acid esters, glycerin fatty acid esters, fatty acid metal soap, alkyl sulfates, alkyl sulfonates, alkyl sulfosuccinates, quaternary ammonium chloride salts, alkylamine hydrochloric acid, betaine type surfactants and the like.

The coating layer may contain an isocyanate-based compound, epoxy-based compound, oxazoline-based compound, aziridine compound, melamine-based compound, silane coupling agent, titanium coupling agent, zirco-aluminate-based coupling agent or the like as a crosslinking agent for improving blocking resistance, water resistance, solvent resistance and mechanical strength. The coating layer may further contain a reaction initiator such as a peroxide or amine, or a sensitizer such as a photosensitive resin if the resin component of an intermediate adhesive layer has a crosslinking reaction point. The coating layer may still further contain inorganic fine particles such as silica, silica sol, alumina, alumina sol, zirconium sol, kaolin, talc, calcium carbonate, calcium phosphate, titaniumoxide, barium sulfate, carbon black, molybdenum sulfide or antimony oxide sol, or organic fine particles such as polystyrene, polyethylene, polyamide, polyester, polyacrylate, epoxy resin, silicone resin or fluororesin to improve blocking resistance and slipperiness. A dispersant, anti-forming agent, coatability enhancer, thickener, ultraviolet absorber, antistatic agent, organic lubricant, anti-blocking agent, antioxidant, foaming agent, dye, pigment, organic filler, inorganic filler and the like may also be contained as required.

Preferably, this coating solution is applied to one side or both sides of a polyester film before crystal orientation completes in the production process of the polyester film, and the resulting polyester film is dried, stretched and heat set. The coating solution may be applied separately from the production process of the polyester film. Since dust or the like is easily contained in the coating solution at the time of coating and a portion containing dust or the like easily causes a defect at the time of printing, a clean atmosphere is desired, and a preferable film can be produced at a relatively low cost. From these points of view, coating is preferably carried out during the production process. The solids content of the coating solution is generally 0.1 to 30 wt %, preferably 1 to 10 wt %. The amount of coating is preferably 0.5 to 50 g per $m^2$ of the running film.

Known coating methods can be employed. For example, roll coating, gravure coating, roll brush coating, spray coating, air knife coating, impregnation, curtain coating and the like may be used alone or in combination.

Film Production Process

The polyethylene-2,6-naphthalene dicarboxylate film used in the present invention can be produced by biaxially stretching an unstretched film obtained in accordance with a commonly used method and heat setting it. It can be advantageously produced by carrying out a relaxation treatment after heat setting. When the glass transition temperature of the substrate polymer of the film is represented by Tg (° C.), the unstretched film is stretched to 2.0 to 6.0 times in longitudinal and transverse directions at a temperature of Tg to (Tg+60)° C. and heat set at a temperature of (Tg+50) to (Tg+140)° C. for 1 to 100 sec, for example. Stretching can be carried out in accordance with commonly used methods such as an IR heater, rolls or tenter. The film may be stretched in longitudinal and transverse directions simultaneously or sequentially.

When a relaxation treatment is to be carried out, it is carried out between the end of heat setting and the end of winding the film on a roll. Relaxation treatment methods include one in which a 0 to 3% relaxation treatment is carried out in a film width direction by reducing the width of a tenter at the intermediate location of a heat setting zone, one in which both ends of a film are released and the film take-off speed is made slower than the film feed speed at a temperature higher than Tg and lower than the fusion temperature of the film, one in which a film is heated with an IR heater between two conveyor rolls having different speeds, one in which a film is carried onto a heated conveyor roll and the speed of a conveyor roll after the heated conveyor roll is reduced, one in which the take-off speed is made slower than the feed speed while a film is carried onto a nozzle through which hot air is blown off after heat setting, one in which a film is carried onto a heated conveyor roll after it is taken up by a film-forming machine and the speed of a conveyor roll is reduced, and one in which the speed of a conveyor roll after a heating zone is made slower than the speed of a roll before the heating zone while it is conveyed through the heating zone in a heating oven or formed by an IR heater. Any one of the methods may be used to carry out a relaxation treatment by making the take-off speed 0.1 to 3% slower than the feed speed. To make a thermal dimensional change within the range of the present invention, in addition to the relaxation treatment, a 0 to 3% stretch treatment may be carried out in a film width direction by expanding the width of a tenter in the heat setting zone. This kind of treatment is not limited to these as long as a thermal dimensional change falls within the range of the present invention.

Thermal Transfer Ink Layer

In the present invention, the thermal transfer ink layer is not particularly limited and known thermal transfer ink layers may be used. That is, the thermal transfer layer comprises a binder component and a coloring component as main ingredients and optionally a softener, plasticizer, dispersant and the like in appropriate amounts. Illustrative examples of the binder component as one of the main ingredients include known waxes such as carnauba wax and paraffin wax, celluloses, polyvinyl alcohols, polyvinyl alcohol partly acetalized products, polyamides, polymer materials having a low melting point and the like. The coloring agent comprises carbon black as a main ingredient and optionally a dye, or an organic or inorganic pigment. The thermal transfer ink layer may contain a sublimating dye. Specific examples of the sublimating dye include dispersible dyes, basic dyes and the like.

To form the thermal transfer ink layer on the surface of the easily adhesive layer of a base layer, known methods such as hot melt coating, and solution coating such as gravure coating, reverse coating and slit die coating in state of a solvent added.

Fusion Preventing Layer

To prevent a thermal head portion from sticking, it is recommended to form a fusion preventing layer of a silicone resin, acrylate having a crosslinkable functional group, methacrylate, polyester copolymer thereof which is crosslinked with an isocyanate, epoxy or melamine, fluororesin, silicone oil or mineral oil on a side devoid of the thermal transfer ink layer. Further, the fusion preventing layer is preferably formed before the film is stretched or after the film is stretched in a longitudinal direction. This not only reduces the thermal hysteresis of the biaxially oriented polyester film when it is processed into a transfer ribbon but also makes it easy to keep the thermal dimensional change properties of the biaxially oriented polyester film within the range of the present invention.

The measurement methods and evaluation methods of property values specified in the present invention are described below.

(1) Thermal Dimensional Change Curve

This is measured using the TMA/SS120C of Seiko Instruments Co., Ltd. A sample having a length of 15 mm and a width of 4 mm is measured using a quartz holder at a measurement temperature of 30 to 280° C. and a temperature elevation rate of 5° C./min under a load of 5 g.

(2) Young's Modulus

A sample having a width of 10 mm and a length of 15 cm is cut out from the film and pulled by an Instron type universal tensile tester at a chuck interval of 100 mm, a pull rate of 10 mm/min and a chart speed of 500 mm/min. The Young's modulus is calculated from the tangent line of an ascending portion in the obtained load-elongation curve.

(3) Density

This is measured by a float-and-sink method at 25° C. in a density gradient tube using an calcium nitrate aqueous solution.

(4) Adhesion

The mending tape 810 of Sumitomo 3M Limited is affixed to the surface of the ink layer of the manufactured thermal transfer ribbon and stripped off quickly. The adhesion of the ink layer is evaluated based on the following criteria according to the degree of separation.

5; Ink Layer Does Not Strip Off

4; stripped area of ink layer is less than 10%

3; stripped area of ink layer is 10% or more and less than 30%

2; stripped area of ink layer is 30% or more and less than 80%

1; stripped area of ink layer is 80% or more.

(5) Printability

Printing is carried out on the VY·200 image receiving sheet (trade name, standard paper of Hitachi, Ltd.) with the Hitachi VY·200 printer (trade name, Hitachi, Ltd.) so as to obtain the maximum optical density. The printability and wrinkling of the manufactured thermal transfer ribbon are evaluated based on the following criteria.

○: image is clearly printed

Δ: printing density is not uniform

X: ribbon is wrinkled and printed image is blurred.

(6) Refractive Index

The refractive index is measured using an Abbe's refractometer with sodium D-rays (589 nm) as a light source and calculated from the following expression. nZ is a refractive index in a direction perpendicular to the surface of the film.

(7) Plane Orientation Coefficient

CuKα1 which has been filtered with a nickel filter is measured with the RU200 of Rigaku Denki Co., Ltd. in accordance with a symmetrical reflection method at an output of 40 kV, 50 mA. The strength ratio I(a)/I(b), which is obtained from the base line of a peak (a) appearing at 2θ=21.0 to 24.5° and the base line of a peak (b) appearing at 2θ=24.5 to 28° when measured by a symmetrical reflection method using X-ray diffraction, is taken as plane orientation coefficient.

(8) Evaluation of Delamination of Surface of Base Film

Printing is carried out on the VY·200 image receiving sheet (trade name, standard paper of Hitachi, Ltd.) with the Hitachi VY·200 printer (trade name, Hitachi, Ltd.) so as to obtain the maximum optical density. The delamination of the surface of the manufactured thermal transfer ribbon is evaluated based on the following criteria.

○: ink layer itself is not transferred to receiving sheet

X: ink layer itself is transferred to receiving sheet.

EXAMPLES

The following examples are provided for the purpose of further illustrating the present invention but are in no way to be taken as limiting.

Example 1

Polyethylene-2,6-naphthalene dicarboxylate having an intrinsic viscosity measured at 25° C. in an o-chlorophenol solution of 0.61 and containing 0.4 wt % of spherical silica particles having a particle diameter of 1.2 μm was melt-extruded into the form of a film by an extruder and a T die and forced to make close contact with a water-cooled drum to be solidified by quenching so as to produce an unstretched film. This unstretched film was stretched to 4.1 times in a longitudinal direction (mechanical axis direction) at 144° C.

A coating agent having the following composition 1 was applied to the ink layer-free side of this stretched film as a fusion preventing layer with a gravure coater to ensure that the coating film should have a thickness of 0.5 μm after dried, and a coating agent having the following composition 2 was applied to the ink layer side of the film as an easily-adhesive layer with a gravure coater to ensure that the coating film should have a thickness of 0.1 μm after dried. Thereafter, the film was sequentially stretched to 3.7 times in a transverse direction (width direction) at 140° C. and heat set at 240° C. to produce a biaxially oriented film having a thickness of 5.1 μm (4.5 μm without coating layers) without carrying out a relaxation treatment in the width direction.

| (composition 1 of coating agent) | |
|---|---|
| acrylic ester | 14.0 wt % |
| amino-modified silicone | 5.9 wt % |
| isocyanate | 0.1 wt % |
| water | 80.0 wt % |
| | 100.0 wt % |
| (composition 2 of coating agent) | |
| acryl-modified polyester | 2.78 wt % |
| epoxy resin | 0.02 wt % |
| nonionic surfactant | 0.20 wt % |
| water | 97.00 wt % |
| | 100.00 wt % |

The obtained polyethylene-2,6-naphthalene dicarboxylate base film for a thermal transfer ribbon was measured for its Young's moduli in longitudinal and transverse directions and thermal dimensional change curves under load in longitudinal and transverse directions to obtain its dimensional change rates at 200° C. and dimensional change rates at 230° C.

Thereafter, thermal transfer ink having the following composition was coated on a side opposite to the fusion preventing layer of the base film by a gravure coater to ensure that the coating film should have a thickness of 1.0 μm so as to manufacture a thermal transfer ribbon.

| (composition of thermal transfer ink) | |
|---|---|
| magenta dye (MSRedG) | 3.5 wt % |
| polyvinyl acetacetal resin | 3.5 wt % |
| methyl ethyl ketone | 46.5 wt % |
| toluene | 46.5 wt % |
| | 100.00 wt % |

The printability of the manufactured thermal transfer ribbon was evaluated. The evaluation results are shown in Table 1.

Example 2

A base film was produced in the same manner as in Example 1 except that the stretch ratio in a longitudinal direction was changed to 3.7 times and one in a transverse direction to 3.9 times.

Thereafter, a thermal transfer ribbon was manufactured by coating thermal transfer ink in the same manner as in Example 1 and evaluated. The evaluation results are shown in Table 1.

Example 3

A base film was produced in the same manner as in Example 1 except that the stretch ratio in a longitudinal direction was changed to 4.8 times and one in a transverse direction to 3.9 times and that heat setting was carried out at 245° C. Thereafter, a thermal transfer ribbon was manufactured by coating transfer ink in the same manner as in Example 1 and evaluated. The evaluation results are shown in Table 1.

Example 4

A base film was produced in the same manner as in Example 1 except that the stretch ratio in a longitudinal direction was changed to 5.0 times and one in a transverse direction to 4.0 times, heat setting was carried out at 240° C. and the thickness of a film was changed to 3.1 μm (2.5 μm without coating layers). Thereafter, a thermal transfer ribbon was manufactured by coating transfer ink in the same manner as in Example 1 and evaluated. The evaluation results are shown in Table 1.

Comparative Example 1

A base film was produced in the same manner as in Example 1 except that heat setting was carried out at 210° C. Thereafter, a thermal transfer ribbon was manufactured by coating transfer ink in the same manner as in Example 1 and evaluated. The evaluation results are shown in Table 1.

Comparative Example 2

A base film was produced in the same manner as in Example 1 except that the stretch ratio in a longitudinal direction was changed to 3.0 times and one in a transverse direction to 3.1 times. Thereafter, a thermal transfer ribbon was manufactured by coating transfer ink in the same manner as in Example 1 and evaluated. The evaluation results are shown in Table 1.

Comparative Example 3

A base film was produced in the same manner as in Example 1 except that the stretch ratio in a longitudinal direction was changed to 3.6 times and one in a transverse direction to 3.9 times, heat setting was carried out at 240° C. and the thickness of a film was changed to 3.1 μm (2.5 μm without coating layers). Thereafter, a thermal transfer ribbon was manufactured by coating transfer ink in the same manner as in Example 1 and evaluated. The evaluation results are shown in Table 1.

Comparative Example 4

Polyethylene terephthalate having an intrinsic viscosity of 0.61 measured at 25° C. in an o-chlorophenol solution and containing 0.4 wt % of spherical silica particles having a particle size of 1.2 μm was used. It was stretched in a multiple-stage longitudinal stretching system; that is, it was stretched in a longitudinal direction to 2.2 times at 125° C in the first stage, 1.1 times at 125° C. in the second stage and 2.3 times at 115° C. in the third stage, which added up to a total three-stage longitudinal stretch ratio of 5.6 times, and then stretched to 3.8 times in a transverse direction in a tenter oven at 110° C. Thereafter, a thermal transfer ribbon was manufactured and-evaluated in the same manner as in Example 1 except that a fixed-length stretch heat treatment was carried out at 225° C. and then another heat treatment was carried out while the film was shrunk 6% in a transverse direction at 210° C. The evaluation results are shown in Table 1.

Since all the films of Comparative Examples 1 to 4 had poor thermal dimensional stability under load in a longitudinal direction, a ribbon having excellent printability could not be obtained from the films.

TABLE 1

| | | | | Ex. 1 | Ex. 2 | Ex. 3 | Ex. 4 | C. Ex. 1 | C. Ex. 2 | C. Ex. 3 | C. Ex. 4 |
|---|---|---|---|---|---|---|---|---|---|---|---|
| | | | | main ingredient | | | | | | | |
| | | | | PEN | PEN | PEN | PEN | PEN | PEN | PEN | PET |
| film-forming conditions | stretch ratio in longitudinal direction | | number of times | 4.1 | 3.7 | 4.8 | 5 | 4.1 | 3 | 3.6 | 5.6 |
| | stretch ration in transverse direction | | number of times | 3.7 | 3.9 | 3.9 | 4 | 3.7 | 3.1 | 3.9 | 3.8 |
| | heat setting temperature | | ° C. | 240 | 240 | 245 | 240 | 210 | 240 | 240 | 225 |
| | relaxation treatment | | % | 0 | 0 | 0 | 0 | 0 | 0 | 0 | 6 |
| | thickness of base film | | μm | 5.1 | 5.1 | 5.1 | 3.1 | 5.1 | 5.1 | 3.1 | 5.1 |
| | Young's moduli | MD | $kg/mm^2$ | 680 | 670 | 660 | 690 | 660 | 580 | 610 | 560 |
| physical | | TD | $kg/mm^2$ | 580 | 610 | 600 | 600 | 580 | 580 | 610 | 500 |
| properties | | MD + TD | $kg/mm^2$ | 1260 | 1280 | 1260 | 1290 | 1240 | 1160 | 1220 | 1060 |
| | density | | $g/cm^3$ | 1.3580 | 1.3574 | 1.3593 | 1.3582 | 1.3520 | 1.3571 | 1.3573 | 1.3960 |
| | dimensional change at 200° C. | MD | % | −0.2 | 0.0 | 0.0 | −0.4 | −0.9 | 1.0 | 0.9 | −1.5 |
| | | TD | % | −0.3 | 0.0 | 0.0 | −0.1 | −0.7 | 0.9 | 0.8 | −0.4 |
| | dimensional change at 230° C. | MD | % | 0.2 | 0.7 | 0.1 | −0.2 | −4.0 | 4.5 | 3.9 | −3.6 |
| | | TD | % | −0.2 | 0.4 | −0.1 | 0.7 | −2.5 | 3.6 | 3.2 | −0.6 |
| printability | | | ○ | ○ | ○ | ○ | ○ | X | X | Δ | X |

Ex.: Example.
MD: longitudinal direction of film
TD: transverse direction of film
C. Ex.: Comparative Example Example 5

Polyethylene-2,6-naphthalene dicarboxylate having an intrinsic viscosity of 0.61 measured at 25° C. in an o-chlorophenol solution and containing 0.4 wt % of spherical silica particles having a particle diameter of 1.2 μm was melt-extruded into the form of a sheet by an extruder and a T die and forced to make close contact with a water-cooled drum to be solidified by quenching so as to produce an unstretched film. This unstretched film was stretched to4.3 times in a longitudinal direction (mechanical axis direction) at 144° C.

The coating agent having the composition 1 used in Example 1 was applied to an ink layer-free side of this longitudinally stretched film as a fusion preventing layer with a gravure coater to ensure that the coating film should have a thickness of 0.5 μm after dried, and the coating agent having the composition 2 used in Example 1 was applied to the ink layer side of the film as an easily adhesive layer with a gravure coater to ensure that the coating film should have a thickness of 0.1 μm after dried. Thereafter, the film was sequentially stretched to 3.5 times in a transverse direction (width direction) at 140° C., heat set at 240° C. and subjected to a 2% relaxation treatment in the width direction to produce a biaxially oriented film having a thickness of 5.1 μm (4.5 μm without coating layers).

The obtained polyethylene-2,6-naphthalene dicarboxylate base film for a thermal transfer ribbon was measured for its Young's moduli in longitudinal and transverse directions, refractive index, plane orientation coefficient, density and thermal dimensional change curves under load in longitudinal and transverse directions to obtain its dimensional change rates at 200° C. and dimensional change rates at 230° C.

Thereafter, transfer ink having the same composition as in Example 1 was coated on a side opposite to the fusion preventing layer of the base film by a gravure coater to ensure that the coating film should have a thickness of 1.0 μm so as to manufacture a transfer ribbon.

The printability of the manufactured thermal transfer ribbon was evaluated. The evaluation results are shown in Table 2.

Example 6

A base film was produced in the same manner as in Example 5 except that the stretch ratio in a longitudinal direction was changed to 3.9 times and one in a transverse direction to 3.9 times and a 1% relaxation treatment was carried out in a transverse direction.

Thereafter, a thermal transfer ribbon was manufactured by coating transfer ink in the same manner as in Example 5 and evaluated. The evaluation results are shown in Table 2.

Example 7

A base film was produced in the same manner as in Example 5 except that the stretch ratio in a longitudinal direction was changed to 4.8 times and one in a transverse direction to 3.9 times, heat setting was carried out at 243° C. and a 1% relaxation treatment was carried out in a transverse direction. Thereafter, a thermal transfer ribbon was manufactured by coating transfer ink in the same manner as in Example 5 and evaluated. The evaluation results are shown in Table 2.

Example 8

A base film was produced in the same manner as in Example 5 except that the stretch ratio in a longitudinal direction was changed to 5.0 times and one in a transverse direction to 4.0 times, heat setting was carried out at 240° C. and a −1% relaxation treatment (1% stretch treatment) was carried out in a transverse direction and the thickness of a film was changed to 3.1 μm (2.5 μm without coating layers). Thereafter, a thermal transfer ribbon was manufactured by coating transfer ink in the same manner as in Example 5 and evaluated. The evaluation results are shown in Table 2.

Comparative Example 5

A base film was produced in the same manner as in Example 5 except that heat setting was carried out at 210° C. Thereafter, a thermal transfer ribbon was manufactured by coating transfer ink in the same manner as in Example 5 and evaluated. The evaluation results are shown in Table 2.

Comparative Example 6

A base film was produced in the same manner as in Example 5 except that the stretch ratio in a longitudinal direction was changed to 3.0 times and one in a transverse direction to 3.1 times. Thereafter, a thermal transfer ribbon was manufactured by coating transfer ink in the same manner as in Example 5 and evaluated. The evaluation results are shown in Table 2.

Comparative Example 7

A base film was produced in the same manner as in Example 5 except that the stretch ratio in a longitudinal direction was changed to 3.6 times and one in a transverse direction to 3.9 times, heat setting was carried out at 240° C. and the thickness of a film was changed to 3.1 μm (2.5 μm without coating layers). Thereafter, a thermal transfer ribbon was manufactured by coating transfer ink in the same manner as in Example 5 and evaluated. The evaluation results are shown in Table 2.

Comparative Example 8

Polyethylene terephthalate having an intrinsic viscosity of 0.61 measured at 25° C. in an o-chlorophenol solution and containing 0.4 wt % of spherical silica particles having a particle size of 1.2 μm was used. It was stretched in a multiple-stage longitudinal stretching system: that is, it was stretched in a longitudinal direction to 2.2 times at 125° C. in the first stage, 1.1 times at 125° C. in the second stage and 2.3 times at 115° C. in the third stage, which added up to a total three-stage longitudinal stretch ratio of 5.6 times, and then stretched to 3.8 times in a transverse direction in a tenter oven at 110° C. Thereafter, a thermal transfer ribbon was manufactured and evaluated in the same manner as in Example 5 except that the obtained biaxially oriented film was subjected to a fixed-length stretch heat treatment at 225° C. and then to another heat treatment while it was shrunk 6% in a transverse direction at 210° C. The evaluation results are shown in Table 2.

Example 9

Polyethylene-2,6-naphthalene dicarboxylate having an intrinsic viscosity of 0.61 measured at 25° C. in an o-chlorophenol solution and containing 0.4 wt % of spherical silica particles having a particle diameter of 1.2 μm was melt-extruded into the form of a sheet by an extruder and a T die and forced to make close contact with a water-cooled drum to be solidified by quenching so as to produce an unstretched film. This unstretched film was stretched to 4.1 times in a longitudinal direction (mechanical axis direction) at 144° C.

The coating agent having the composition 1 used in Example 1 was applied to an ink layer-free side of this longitudinally stretched film as a fusion preventing layer with a gravure coater to ensure that the coating film should have a thickness of 0.5 μm after dried, and a coating agent having the following composition 2 was applied to the ink layer side of the film as an easily adhesive layer with a gravure coater to ensure that the coating film should have a thickness of 0.1 μm after dried. Thereafter, the film was sequentially stretched to 3.7 times in a transverse direction (width direction) at 140° C. and heat set at 240° C. to produce a biaxially oriented film having a thickness of 5.1 μm without carrying out a relaxation treatment in a transverse direction.

Composition 2 of coating agent (acryl+polyester+epoxy)

The composition 2 of the coating agent was as follows. The coating agent consisted of 42 wt % in terms of solids content of an acrylic resin consisting 65 mol % of methyl methacrylate/28 mol % of ethyl acrylate/2 mol % of 2-hydroxyethyl methacrylate/5 mol % of N-methylolacrylamide; 42 wt % in terms of solids content of a polyester resin consisting of 35 mol % of terephthalic acid/13 mol % of isophthalic acid/2 mol % of 5-sodium sulfoisophthalic acid as acid components and 45 mol % of ethylene glycol/5 mol % of diethylene glycol as glycol

TABLE 2

| | | | | Ex. 5 | Ex. 6 | Ex. 7 | Ex. 8 | C. Ex. 5 | C. Ex. 6 | C. Ex. 7 | C. Ex. 8 |
|---|---|---|---|---|---|---|---|---|---|---|---|
| | | | | main ingredient | | | | | | | |
| | | | | PEN | PEN | PEN | PEN | PEN | PEN | PEN | PEN |
| film-forming conditions | stretch ratio in longitudinal direction | | number of times | 4.3 | 3.9 | 4.8 | 4.9 | 4.1 | 3 | 3.6 | 5.6 |
| | stretch ration in transverse direction | | number of times | 3.5 | 3.9 | 3.9 | 4 | 3.7 | 3.1 | 3.9 | 3.8 |
| | heat setting temperature | | ° C. | 240 | 240 | 243 | 240 | 210 | 240 | 240 | 225 |
| | relaxation treatment | | % | 2 | 1 | 1 | −1 | 0 | 0 | 0 | 0 |
| physical properties | thickness of base film | | μm | 5.1 | 5.1 | 5.1 | 3.1 | 5.1 | 5.1 | 3.1 | 5.1 |
| | Young's moduli | MD | $kg/mm^2$ | 700 | 680 | 650 | 680 | 660 | 580 | 610 | 560 |
| | | TD | $kg/mm^2$ | 550 | 640 | 600 | 600 | 580 | 580 | 610 | 500 |
| | | MD + TD | $kg/mm^2$ | 1250 | 1320 | 1270 | 1280 | 1240 | 1160 | 1220 | 1060 |
| | | MD − TD | $kg/mm^2$ | 150 | 40 | 50 | 80 | 80 | 0 | 0 | 60 |
| | refractive index | nZ | | 1.505 | 1.507 | 1.509 | 1.509 | 1.493 | 1.504 | 1.505 | 1.495 |
| | plane orientation coefficient Ia/Ib | | | 0.032 | 0.020 | 0.036 | 0.034 | 0.009 | 0.050 | 0.020 | 0.050 |
| | density | | $g/cm^3$ | 1.3576 | 1.3580 | 1.3593 | 1.3582 | 1.3520 | 1.3571 | 1.3573 | 1.3960 |
| | dimensional change at 200° C. | MD | % | −0.3 | 0.0 | 0.0 | −0.3 | −0.9 | 1.0 | 0.9 | −1.5 |
| | | TD | % | −0.2 | 0.0 | 0.0 | −0.1 | −0.7 | 0.9 | 0.8 | −0.4 |
| | dimensional change at 230° C. | MD | % | −0.2 | 0.4 | 0.2 | −0.1 | −4.0 | 4.5 | 3.9 | −3.6 |
| | | TD | % | 0.2 | 0.7 | −0.1 | 0.8 | −2.5 | 3.6 | 3.2 | −0.6 |
| surface delamination | | | | ○ | ○ | ○ | ○ | X | ○ | ○ | ○ |
| printability | | | | ○ | ○ | ○ | ○ | X | X | Δ | X |

Ex.: Example
MD: longitudinal direction of film
TD: transverse direction of film
C. Ex.: Comparative Example components; 6 wt % in terms of solids content of N,N,N',N'-tetraglycidyl-m-xylylenediamine as an epoxy-based crosslinking agent; and 10 wt % in terms of solids content of lauryl polyoxyethylene as a wetting agent.

The obtained polyethylene-2,6-naphthalene dicarboxylate base film for a thermal transfer ribbon was measured for its Young's moduli in longitudinal and transverse directions and thermal dimensional change curves under load in longitudinal and transverse directions to obtain the inclinations of the curves, dimensional change rates at 200° C. and dimensional change rates at 230° C.

Thereafter, thermal transfer ink having the same composition as in Example 1 was applied to a side opposite to the fusion preventing layer so that a coating film should have a thickness of 1.0 μm with a gravure coater to manufacture a thermal transfer ribbon.

The printability of the manufactured thermal transfer ribbon was evaluated. The evaluation results are shown in Table 3.

Example 10

A thermal transfer ribbon was produced in the same manner as in Example 9 except that a coating agent having the following composition 3 was applied to the ink layer side of a film as an easily adhesive layer with a gravure coater to ensure that the coating film should have a thickness of 0.1 μm after dried.

Composition 3 of coating agent (acryl+polyester+melamine)

The composition 3 of the coating agent was as follows. the coating agent consisted of 40 wt % in terms of solids content of an acrylic resin consisting of 75 mol % of methyl methacrylate/22 mol % of ethyl acrylate/1 mol % of acrylic acid/2 mol % of N-methylolacrylamide; 40 wt % in terms of solids content of a polyester resin consisting of 30 mol % of terephthalic acid/15 mol % of isophthalic acid/5 mol % of 5-sodium sulfoisophthalic acid as acid components and 30 mol % of ethylene glycol/20 mol % of 1,4-butanediol as glycol components; 10 wt % in terms of solids content of methylol melamine, which is a melamine-based compound, as a crosslinking agent; and 10 wt % in terms of solids content of lauryl polyoxyethylene as a wetting agent.

Thereafter, a thermal transfer ribbon was manufactured in the same manner as in Example 9 by coating thermal transfer ink and evaluated. The evaluation results are shown in Table 3.

Example 11

A thermal transfer ribbon was produced in the same manner as in Example 9 except that a coating agent having the following composition 4 was applied to the ink layer side of a film as an easily adhesive layer with a gravure coater to ensure that the coating film should have a thickness of 0.1 μm after dried.

Composition 4 of Coating Agent (vinyl resin-modified polyester+epoxy)

The composition of the coating agent 4 was as follows. The coating agent consisted of 84 wt % in terms of solids content of a vinyl resin-modified polyester as a main ingredient which consisted of a vinyl resin segment comprising methyl methacrylate/isobutyl methacrylate/acrylic acid/methacrylic acid/glycidyl methacrylate and a polyester segment comprising terephthalic acid/isophthalic acid/5-sodium sulfoisophthalic acid as acid components and ethylene glycol/neopentyl glycol as glycol components; 6 wt % in terms of solids content of N,N,N',N',-tetraglycidyl-m-xylylenediamine as an epoxy-based crosslinking agent; and 10 wt % in terms of solids content of lauryl polyoxyethylene as a wetting agent.

Thereafter, a thermal transfer ribbon was manufactured in the same manner as in Example 9 by coating thermal transfer ink and evaluated. The evaluation results are shown in Table 3.

Example 12

A base film was produced in the same manner as in Example 9 except that the stretch ratio in a longitudinal direction was changed to 3.7 times and one in a transverse direction to 3.9 times.

Thereafter, a thermal transfer ribbon was manufactured by coating thermal transfer ink in the same manner as in Example 9 and evaluated. The evaluation results are shown in Table 3.

Example 13

A base film was produced in the same manner as in Example 9 except that the stretch ratio in a longitudinal direction was changed to 4.8 times and one in a transverse direction to 3.9 times and heat setting was carried out at 245° C. Thereafter, a thermal transfer ribbon was manufactured by coating thermal transfer ink in the same manner as in Example 9 and evaluated. The evaluation results are shown in Table 3.

Example 14

A base film was produced in the same manner as in Example 9 except that the stretch ratio in a longitudinal direction was changed to 5.0 times and one in a transverse direction to 4.0 times, heat setting was carried out at 240° C. and the thickness of a film was changed to 3.1 μm. Thereafter, a thermal transfer ribbon was manufactured by coating thermal transfer ink in the same manner as in Example 9 and evaluated. The evaluation results are shown in Table 3.

Comparative Example 9

A base film was produced in the same manner as in Example 9 except that heat setting was carried out at 210° C. Thereafter, a thermal transfer ribbon was manufactured by coating thermal transfer ink in the same manner as in Example 9 and evaluated. The evaluation results are shown in Table 3.

Comparative Example 10

A base film was produced in the same manner as in Example 9 except that the stretch ratio in a longitudinal direction was changed to 3.0 times and one in a transverse direction to 3.1 times. Thereafter, a thermal transfer ribbon was manufactured by coating thermal transfer ink in the same manner as in Example 9 and evaluated. The evaluation results are shown in Table 3.

Comparative Example 11

A base film was produced in the same manner as in Example 9 except that the stretch ratio in a longitudinal direction was changed to 3.6 times and one in a transverse direction to 3.9 times, heat setting was carried out at 240° C. and the thickness of a film was changed to 2.5 μm. Thereafter, a thermal transfer ribbon was manufactured by coating thermal transfer ink in the same manner as in Example 9 and evaluated. The evaluation results are shown in Table 3.

Comparative Example 12

Polyethylene terephthalate having an intrinsic viscosity of 0.61 measured at 25° C. in an o-chlorophenol solution and containing 0.4 wt % of spherical silica particles having a particle diameter of 1.2 μm was used. It was stretched in a multiple-stage longitudinal stretching system; that is, it was stretched in a longitudinal direction to 2.2 times at 125° C. in the first stage, 1.1 times at 125° C. in the second stage and 2.3 times at 115° C. in the third stage, which added up to a total three-stage longitudinal stretch ratio of 5.6 times, and then stretched to 3.8 times in a transverse direction in a tenter oven at 110° C. Thereafter, a thermal transfer ribbon was manufactured and evaluated in the same manner as in Example 9 except that the biaxially oriented film was subjected to a fixed-length stretch heat treatment at 225° C. and then to another heat treatment while it was shrunk 6% in a transverse direction at 210° C. The evaluation results are shown in Table 3.

TABLE 3

| | | | | Ex. 9 | Ex. 10 | Ex. 11 | Ex. 12 | Ex. 13 | Ex. 14 |
|---|---|---|---|---|---|---|---|---|---|
| | | | | main ingredient | | | | | |
| | | | | PEN | PEN | PEN | PEN | PEN | PEN |
| film-forming conditions | stretch ratio in longitudinal direction | | number of times | 4.1 | 4.1 | 4.1 | 4.1 | 4.8 | 5 |
| | stretch ratio in transverse direction | | number of times | 3.7 | 3.7 | 3.7 | 3.7 | 3.9 | 4 |
| | heat setting temperature | | ° C. | 240 | 240 | 240 | 240 | 245 | 240 |
| | relaxation treatment | | % | 0 | 0 | 0 | 0 | 0 | 0 |
| physical properties | thickness of base film | | μm | 5.1 | 5.1 | 5.1 | 5.1 | 5.1 | 3.1 |
| | Young's moduli | MD | $kg/mm^2$ | 680 | 680 | 680 | 670 | 660 | 696 |
| | | TD | $kg/mm^2$ | 580 | 580 | 580 | 610 | 600 | 600 |
| | | MD + TD | $kg/mm^2$ | 1260 | 1260 | 1.260 | 1280 | 1260 | 1290 |
| | density | | $g/cm^3$ | 1.3580 | 1.3580 | 1.3580 | 1.3574 | 1.3593 | 1.3582 |
| | dimensional change at 200° C. | MD | % | −0.2 | −0.2 | −0.2 | 0.0 | 0.0 | −0.4 |
| | | TD | % | −0.3 | −0.3 | −0.3 | 0.0 | 0.0 | −0.1 |
| | dimensional change at 230° C. | MD | % | 0.2 | 0.2 | 0.2 | 0.7 | 0.1 | −0.2 |
| | | TD | % | −0.2 | −0.2 | −0.2 | 0.4 | −0.1 | 0.7 |
| adhesion | | | | 5 | 5 | 5 | 5 | 5 | 5 |
| printability | | | | ○ | ○ | ○ | ○ | ○ | ○ |

| | | | | C. Ex. 9 | C. Ex. 10 | C. Ex. 11 | C. Ex. 12 |
|---|---|---|---|---|---|---|---|
| | | | | main ingredient | | | |
| | | | | PEN | PEN | PEN | PET |
| film-forming conditions | stretch ratio in longitudinal direction | | number of times | 4.1 | 3 | 3.6 | 5.6 |
| | stretch ratio in transverse direction | | number of times | 3.7 | 3.1 | 3.9 | 3.8 |
| | heat setting temperature | | ° C. | 210 | 240 | 240 | 225 |
| | relaxation treatment | | % | 0 | 0 | 0 | 6 |
| physical properties | thickness of base film | | μm | 5.1 | 5.1 | 3.1 | 5.1 |
| | Young's moduli | MD | $kg/mm^2$ | 660 | 580 | 610 | 560 |
| | | TD | $kg/mm^2$ | 580 | 580 | 610 | 500 |
| | | MD + TD | $kg/mm^2$ | 1240 | 1160 | 1220 | 1060 |
| | density | | $g/cm^3$ | 1.3520 | 1.3571 | 1.3573 | 1.3960 |
| | dimensional change at 200° C. | MD | % | −0.9 | 1.0 | 0.9 | −1.5 |
| | | TD | % | −0.7 | 0.9 | 0.8 | −0.4 |
| | dimensional change at 230° C. | MD | % | −4.0 | 4.5 | 3.9 | −3.6 |
| | | TD | % | −2.5 | 3.6 | 3.2 | −0.6 |
| adhesion | | | | 5 | 5 | 5 | 5 |
| printability | | | | X | X | Δ | X |

Ex.: Example
MD: longitudinal direction of film
TD: transverse direction of film
C. Ex.: Example

What is claimed is:

1. A base film for a thermal transfer ribbon, which is a biaxially oriented polyester film comprising polyethylene-2,6-naphthalene dicarboxylate as a main constitutional element, wherein in a temperature-dimensional change curve under load in a longitudinal direction of the film, the dimensional change from the original length of the film at temperatures of up to 200° C. is 1.0% or less and the dimensional change from the original length of the film at temperatures of up to 230° C. is 3.0% or less.

2. The base film for a thermal transfer ribbon according to claim 1, wherein in the temperature-dimensional change curve under load in a longitudinal direction of the film, the dimensional change from the original length of the film at temperatures of up to 200° C. is 0.6% or less and the dimensional change from the original length of the film at temperatures of up to 230° C. is 1% or less.

3. The base film for a thermal transfer ribbon according to claim 1, wherein in the temperature-dimensional change curve under load in a transverse direction of the film, the dimensional change from the original length of the film at temperatures of up to 200° C. is 1.0% or less and the dimensional change from the original length of the film at temperatures of up to 230° C. is 3.0% or less.

4. The base film for a thermal transfer ribbon according to claim 1, wherein the total of Young's moduli in longitudinal and transverse directions of the film is at least 1,200 $kg/mm^2$.

5. The base film for a thermal transfer ribbon according to claim 4, wherein the Young's modulus in the longitudinal direction of the film is at least 620 $kg/mm^2$, which is at least 30 $kg/mm^2$ larger than the Young's modulus in its transverse direction.

6. The base film for a thermal transfer ribbon according to claim 1, which has a refractive index (nZ) in its thickness direction of at least 1.500.

7. The base film for a thermal transfer ribbon according to claim 1, which has a plane orientation coefficient of 0.010 to 0.040.

8. The base film for a thermal transfer ribbon according to claim 1, which has a density of 1.3530 $g/cm^3$ to 1.3599 $g/cm^3$.

9. The base film for a thermal transfer ribbon according to claim 1, which has a thickness of 0.5 to 10 $\mu$m.

10. The base film for a thermal transfer ribbon according to claim 1, which has a coating layer of at least one water-soluble or water-dispersible resin selected from the group consisting of an urethane resin, polyester resin, acrylic resin and vinyl resin-modified polyester resin, on one side thereof.

11. The base film for a thermal transfer ribbon according to claim 10, wherein the coating layer is formed by coating a water-soluble or water-dispersible solution of the above water-soluble or water-dispersible resin on one side of the film before the completion of orientation and crystallization and drying, stretching and heat setting the film.

12. The base film for a thermal transfer ribbon according to claim 1, which is for a sublimation-type thermal transfer ribbon.

13. A process for using the base film of claim 1 as a base film for a thermal transfer ribbon.

14. A thermal transfer ribbon comprising the base film of claim 1 and a sublimation-type thermal transfer ink layer on the base film.

* * * * *